United States Patent
VanBlon et al.

(10) Patent No.: US 10,956,613 B2
(45) Date of Patent: Mar. 23, 2021

(54) SENSITIVE INFORMATION FILTER

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); Mark Patrick Delaney, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 175 days.

(21) Appl. No.: 16/129,027

(22) Filed: Sep. 12, 2018

(65) Prior Publication Data

US 2020/0082125 A1   Mar. 12, 2020

(51) Int. Cl.
| | |
|---|---|
| G06F 21/00 | (2013.01) |
| G06F 21/62 | (2013.01) |
| G06F 9/54 | (2006.01) |
| G02B 27/01 | (2006.01) |
| G06F 21/84 | (2013.01) |

(52) U.S. Cl.
CPC ....... *G06F 21/6263* (2013.01); *G02B 27/017* (2013.01); *G06F 9/542* (2013.01); *G06F 21/84* (2013.01)

(58) Field of Classification Search
CPC ...... G06F 21/6263; G06F 9/542; G06F 21/84; G06F 21/6245; G02B 27/017; G02B 2027/014
See application file for complete search history.

(56) References Cited

U.S. PATENT DOCUMENTS

| | | | |
|---|---|---|---|
| 8,849,716 B1* | 9/2014 | Everhart | G06F 21/6245 705/51 |
| 2009/0254572 A1* | 10/2009 | Redlich | G06Q 10/107 |
| 2010/0250497 A1* | 9/2010 | Redlich | F41H 13/0093 707/661 |
| 2017/0063777 A1* | 3/2017 | Ekberg | H04L 51/10 |
| 2017/0173262 A1* | 6/2017 | Veltz | G16H 20/17 |
| 2018/0107835 A1* | 4/2018 | Clement | A63F 13/5255 |
| 2018/0157321 A1* | 6/2018 | Liu | H04L 51/00 |
| 2018/0373885 A1* | 12/2018 | Arad | G06F 21/629 |
| 2019/0065027 A1* | 2/2019 | Hauenstein | G06F 3/014 |
| 2020/0019729 A1* | 1/2020 | Shanmugam | G06F 16/90335 |

* cited by examiner

*Primary Examiner* — Mahfuzur Rahman
(74) *Attorney, Agent, or Firm* — Ference & Associates LLC

(57) ABSTRACT

One embodiments provides a method, including: determining, using a processor, whether content to be displayed on an information handling device comprises sensitive information; filtering, responsive to determining that the content comprises sensitive information, the sensitive information from the content; displaying, on a display of the information handling device, the content with the sensitive information filtered; and transmitting the sensitive information to a secondary device. Other aspects are described and claimed.

16 Claims, 3 Drawing Sheets

SENSITIVE INFORMATION FILTER

BACKGROUND

Information handling devices ("devices"), for example smart phones, tablet devices, laptops and personal computers, and the like, are capable of receiving and accessing content that may comprise sensitive information. For example, a user may access content (e.g., contained in a stored document, received via an email or SMS message, etc.) that may comprise information that is deemed sensitive (e.g., classified information, privileged information, user banking information, user identity information, etc.). Upon gaining access to the content, the sensitive information is generally presented alongside non-sensitive information.

BRIEF SUMMARY

In summary, one aspect provides a method, comprising: determining, using a processor, whether content to be displayed on an information handling device comprises sensitive information; filtering, responsive to determining that the content comprises sensitive information, the sensitive information from the content; displaying, on a display of the information handling device, the content with the sensitive information filtered; and transmitting the sensitive information to a secondary device.

Another aspect provides an information handling device, comprising: a display; a processor; a memory device that stores instructions executable by the processor to: determine whether content to be displayed on the information handling device comprises sensitive information; filter, responsive to determining that the content comprises sensitive information, the sensitive information from the content; display, on the display, the content with the sensitive information filtered; and transmit the sensitive information to a secondary device.

A further aspect provides an information handling device, comprising: a display; a processor; a memory device that stores instructions executable by the processor to: display sensitive information received from a primary display device, wherein the sensitive information is filtered from content displayed by the primary display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
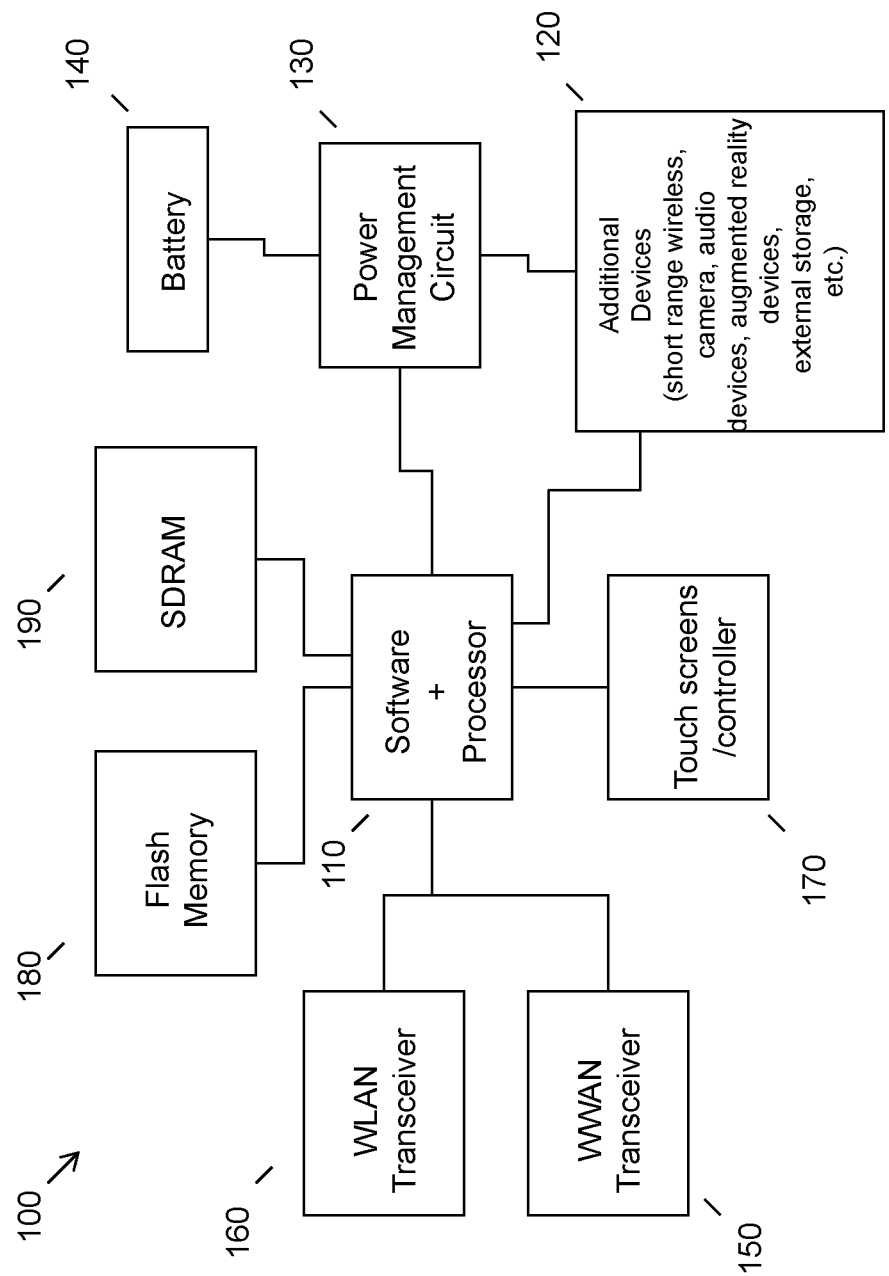
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to access information throughout the day including, but not limited to, personal and/or business documents, emails, websites, other articles of information, and the like. Sometimes, the material being accessed may contain sensitive information (e.g., information designated as sensitive by a corporation, user identity information, user banking information, etc.) that a user would like to keep private. When information is being presented on a display (e.g., resident on a smart phone, tablet, laptop or PC monitor, etc.) it may be seen by other individuals depending on one or more criteria (e.g., size of the display, location in which the content is being accessed, volume of other individuals in the location the content is being accessed, etc.). For example, there is a higher probability that other individuals may be able to see displayed content when the content is accessed in a public location (e.g., airport, restaurant, etc.).

In the past, attempts have been made to not only maintain display screen privacy (e.g., by utilizing a physical privacy filters, altering display screen output characteristics, etc.) but also to prevent unauthorized individuals from visualizing sensitive information (e.g., by filtering or redacting the sensitive information out from the remainder of the displayed content when in a public location, etc.). Regarding the former, physical privacy filters that use refraction to hide the contents of a display are not completely effective because unauthorized users may still position themselves in ways to view the contents of a user's display. Additionally, the alteration of display screen output characteristics (e.g., darkening or blurring of the screen, etc.) may make it burdensome for the authorized user to visualize the content. Regarding the latter, although redaction techniques may effectively prevent unauthorized users from visualizing the sensitive information, they also prevent the authorized user from viewing the sensitive information, which they may want to do. Due to the foregoing, a need exists for a more effective way to maintain display privacy so that sensitive information can be safely visualized by an authorized user.

Accordingly, an embodiment provides a method for maintaining privacy of sensitive information by use of a secondary device. In an embodiment, content to be displayed on a device may be analyzed to determine whether the content comprises sensitive information. Sensitive information may be any information designated as sensitive such as information designated as sensitive by a corporation, user identity information, user banking information, other types of information, and the like. Responsive to determining that the content comprises sensitive information, an embodiment may filter the sensitive information from the content and thereafter display the content on a display of the device with the sensitive information filtered. In an embodiment, the sensitive information may be transferred for presentation (e.g., visual presentation, audible presentation, etc.) on a secondary device that is personal to the user. For example, the secondary device may be, but is not limited to, an augmented reality headset (e.g., virtual reality headset, mixed reality headset, etc.), wireless headphones, and the like. Only the user utilizing the secondary device will be able to be apprised of the information transmitted from the primary device to the secondary device, therefore allowing for an optimal amount of privacy is supplied to display the user's sensitive information. Such a technique may allow a user to be apprised of sensitive information while accessing the sensitive information in a public, or non-secure, location.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
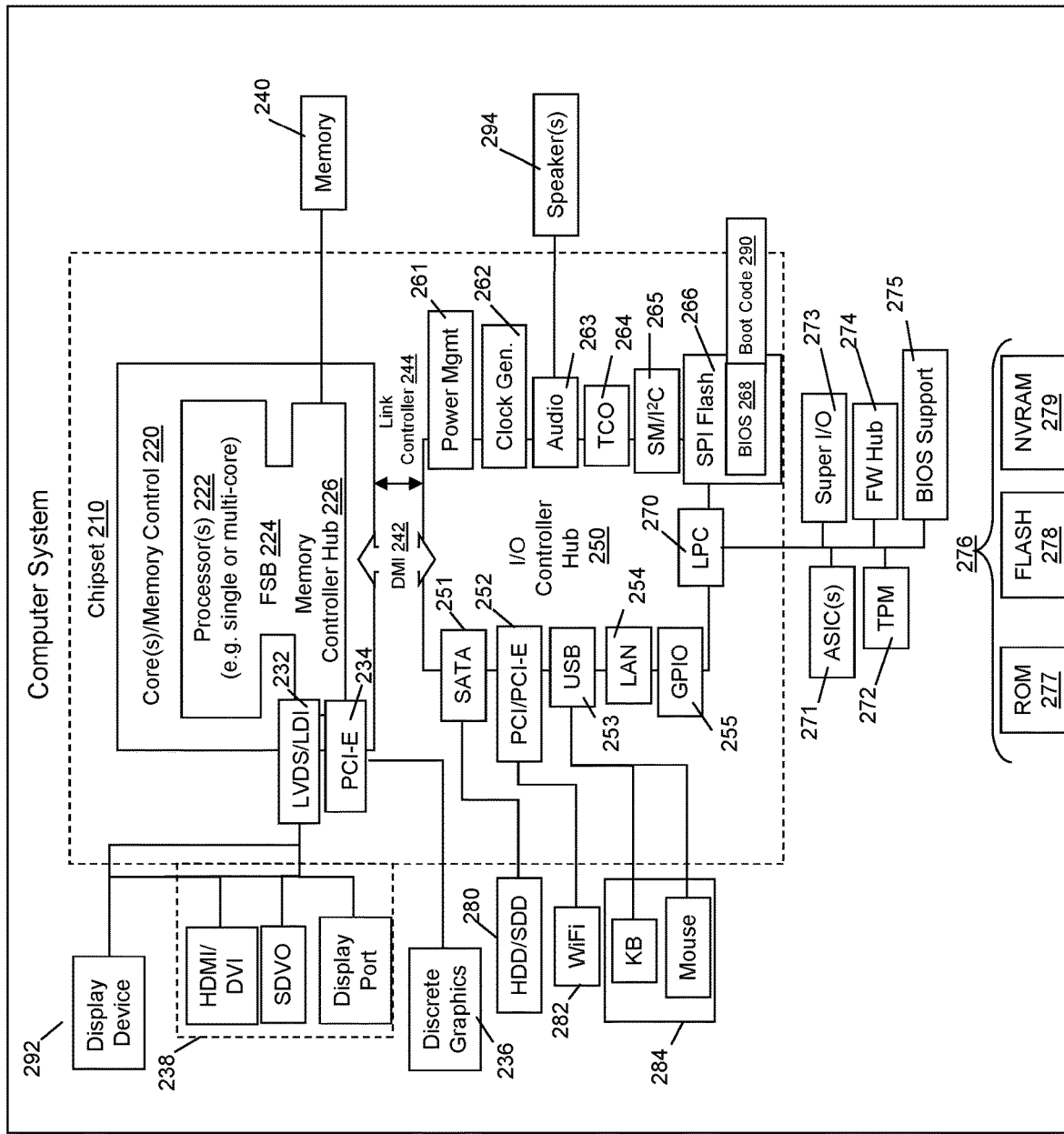
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, personal computer devices generally, augmented reality devices (e.g., virtual reality devices, mixed reality devices, etc.) and/or electronic devices that are capable of connecting to and transmitting information between devices. For example, the circuitry outlined in FIG. 1 may be implemented in a tablet or smart phone embodiment, whereas the circuitry outlined in FIG. 2 may be implemented in a laptop embodiment.

Figure 3:
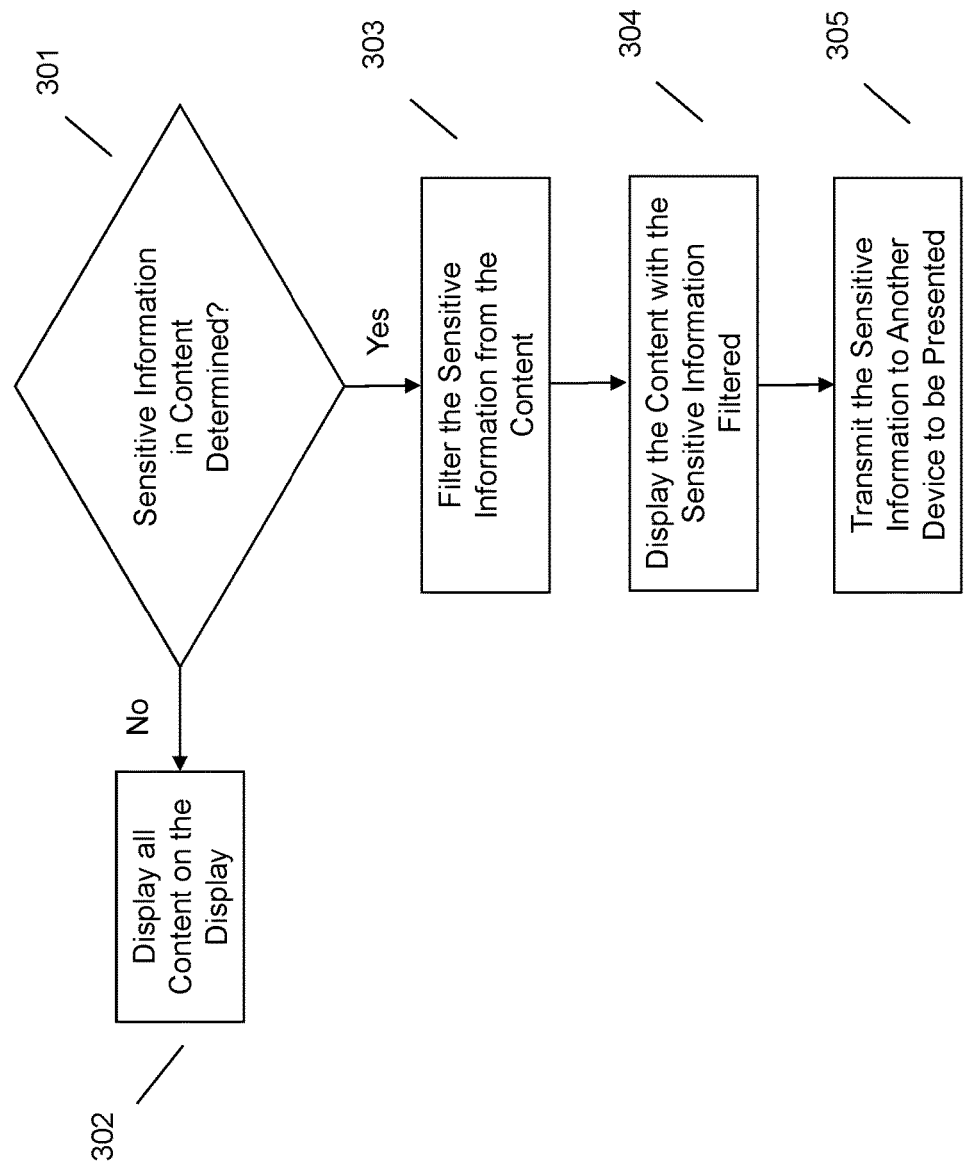
FIG. 3 illustrates an example method of using a secondary device to present sensitive information.

Referring now to FIG. 3, an embodiment may identify, filter, and transmit sensitive information to a secondary device to be presented to a user while the non-sensitive content is presented to the user on a primary device. At 301, an embodiment may determine whether content to be displayed on a device may comprise sensitive information. In an embodiment, the content to be displayed may be virtually any type of information accessible or received by a user (e.g., documents, communications, websites, etc.). The device on which the content is attempted to be displayed on may be considered the primary device.

In an embodiment, sensitive information may virtually any type of information that is designated as sensitive by the user or another entity (e.g., information designated as sensitive by a corporate entity, user identity information, user banking information, other types of private information, and the like). In an embodiment, the sensitive information may be determined by comparing the substance of the content to a stored list comprising a plurality of keywords and/or numbers that may have been designated as sensitive. An embodiment may thereafter identify whether the content comprises at least one keyword or number in the list. Responsive to identifying a match, an embodiment may designate that portion of the content as sensitive.

In an embodiment, information may be intelligently determined to be sensitive by a device by consulting one or more accessible databases. Stated differently, the information determined to be sensitive may not have been explicitly defined by a user. For example, responsive to receiving a communication that contains a 9 digit number having the form XXX-XX-XXXX, an embodiment may consult a database to determine that the number bares a high probability of being associated with a Social Security Number and may therefore classify that portion of the content as sensitive. In an embodiment, the determination may be conducted prior to the presentation of the content to the user.

Responsive to determining, at 301, that the content does not comprise sensitive information, an embodiment may display, at 302, all of the content on a display of the primary device. Conversely, responsive to determining, at 301, that at least a portion of the content comprises sensitive information, an embodiment may filter, at 303, the sensitive information from the content. In an embodiment, the filtering of the content may be conducted prior to the presentation of the content. An embodiment may thereafter display, at 304, the content with the sensitive information filtered on the primary device.

In an embodiment, the filtering of the content may take one or more of a variety of different forms. For example, an embodiment may redact the sensitive information from the body of the content so that the content may be displayed on the primary device with redactions over the determined sensitive portions. In another embodiment, the sensitive portions may be blurred out or censored from the displayed content. In yet another embodiment, the sensitive information may be completely removed from the displayed content so that the displayed content may comprise empty spaces that correspond to the previously included sensitive information.

At 305, an embodiment may transmit the filtered sensitive information to a secondary device to be presented to the user. In an embodiment, the presentation of the sensitive information may involve presenting, using the secondary device, only the filtered sensitive information to the user or may involve presenting the entirety of the content to the user but now including the sensitive information. In an embodiment, a user may be notified (e.g., by a visual or audible notification, etc.) that the sensitive information has been transmitted to a secondary device. In an embodiment, the notification may elaborate on which secondary device the sensitive information was transmitted to if a user has a plurality of secondary devices. Furthermore, in an embodiment, if a primary device has an established connection with a secondary device, then the transmission of sensitive information may happen automatically and a notification will be presented on the primary device stating that sensitive information can be viewed on the connected secondary device. In another embodiment, a ruleset may require that all sensitive information must be viewed on a secondary device, regardless of whether such a device is not currently accessible to the user. In such a situation, the primary device may provide a notification to a user notifying them that a secondary device is required to obtain the sensitive information.

In an embodiment, the secondary device may be a secondary display device (e.g., another device having a display screen, an augmented reality device, etc.). For example, a user having both a smart phone and a smart watch may be attempting to access information on their smart phone. Responsive to determining that the content accessed by the smart phone contains sensitive information, an embodiment may redact the sensitive information on the smart phone and transmit the sensitive information to the user's smart watch. In another embodiment, the secondary display device may be an augmented reality headset that is capable of displaying at least one of: virtual reality and mixed reality. In this embodiment, the sensitive information may therefore be displayed to the user on their augmented reality headset. Displaying information in this fashion may substantially increase user privacy because generally only the user wearing the headset may be able to visualize the sensitive information. As an additional security measure, an embodiment may alter a visual aspect (e.g., font, color, size, etc.) of the sensitive information so as to further prevent unauthorized individuals from seeing the sensitive information. For example, an embodiment may decrease the size of the displayed font, adjust the color of the displayed words so that they blend in more with a background, and the like.

In an embodiment, the secondary device may be an audible output device (e.g., headphones, etc.). In such a configuration, the presentation of the sensitive information may be delivered audibly to the user through the audible output device. For example, if a user's primary device is a smart phone and their secondary device is a headphone set an embodiment may redact the sensitive information from the smart phone and audibly recite the sensitive information to the user on their headphones.

In a situation where a user has a plurality of secondary devices proximate to the primary device, an embodiment may consult a device hierarchy to determine which device to transmit the sensitive information to. For instance, in an embodiment, the device hierarchy may control the primary device to always send the sensitive information to the augmented reality device. In another instance, the device hierarchy may control the primary device to send the sensitive information to the device determined to be most proximate to the primary device. As an example of the foregoing, if a user's primary device is a smart phone and the user also has a smart watch and an augmented reality device within a predetermined proximity to the smart phone, the smart phone may automatically send the sensitive information to the user's augmented reality device.

The various embodiments described herein thus represent a technical improvement to conventional sensitive information filtering and display techniques. Using the techniques described herein, an embodiment may determine whether content directed to be displayed on a device comprises sensitive information. Responsive to determining that the content does comprise sensitive information, an embodiment may filter the sensitive information from the content and display the content on the device with the sensitive information filtered. Thereafter, an embodiment may transmit the sensitive information to a secondary device to be presented to the user, where the secondary device is a device that is even more private to the user (e.g., an augmented reality headset, another display device, headphones, etc.). Such a method may enable users to access and view content that may comprise sensitive information in public while ensuring that the information is protected from unauthorized users.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining, using a processor, whether content to be displayed on an information handling device comprises sensitive information, wherein the determining comprises:
   comparing the content to at least one database comprising a plurality of predetermined keywords that are associated with sensitive information; and
   identifying whether the content comprises at least one keyword found in the database;
   filtering, responsive to determining that the content comprises sensitive information and prior to displaying the content, the sensitive information from the content;
   displaying, on a display of the information handling device, the content with the sensitive information filtered, wherein displaying the content with the information filtered comprises displaying non-sensitive information of the content;
   transmitting the sensitive information to a secondary display device, wherein the secondary display device is an augmented reality headset that displays at least one of: virtual reality and mixed reality; and
   providing a notification to a user that the sensitive information has been transmitted to the secondary device.

2. The method of claim 1, wherein the filtering comprises redacting the sensitive information on the display.

3. The method of claim 1, further comprising presenting, after the transmitting and on the secondary device, the content comprising the sensitive information.

4. The method of claim 3, wherein the presenting comprises displaying the sensitive information on the secondary display device.

5. The method of claim 4, further comprising altering, on the secondary display device, a visual aspect of the sensitive information.

6. The method of claim 5, wherein the visual aspect is at least one text characteristic selected from the group consisting of font, color, and size.

7. The method of claim 3, wherein the secondary device is an audible output device and wherein the presenting comprises audibly outputting the sensitive information using the audible output device.

8. The method of claim 1, wherein the transmitting comprises transmitting an audible response containing the sensitive information to the secondary device.

9. An information handling device, comprising:
a display;
a processor;
a memory device that stores instructions executable by the processor to:
determine whether content to be displayed on the information handling device comprises sensitive information, wherein to determine comprises:
compare the content to a list comprising a plurality of predetermined keywords that are associated with sensitive information; and
identify whether the content comprises at least one keyword found in the list;
filter, responsive to determining that the content comprises sensitive information and prior to displaying the content, the sensitive information from the content;
display, on the display, the content with the sensitive information filtered, wherein to display the content with the information filtered comprises displaying non-sensitive information of the content;
transmit the sensitive information to a secondary display device, wherein the secondary display device is an augmented reality headset that displays at least one of: virtual reality and mixed reality; and
provide a notification to a user that the sensitive information has been transmitted to the secondary device.

10. The information handling device of claim 9, wherein the instructions executable by the processor to filter comprise instructions executable by the processor to redact the sensitive information on the display.

11. The information handling device of claim 9, wherein the instructions are further executable by the processor to present, after the transmitting and on the secondary device, the content comprising the sensitive information.

12. The information handling device of claim 11, wherein the instructions executable by the processor to present comprise instructions executable by the processor to display the sensitive information on the secondary display device.

13. The information handling device of claim 12, wherein the instructions are further executable by the processor to alter, on the secondary display device, a visual aspect of the sensitive information.

14. The information handling device of claim 11, wherein the secondary device is an audible output device and wherein the instructions executable by the processor to present comprise instructions executable by the processor to audibly output the sensitive information using the audible output device.

15. The information handling device of claim 9, wherein the transmitting comprises transmitting an audible response containing the sensitive information to the secondary device.

16. An information handling device, comprising:
a display;
a processor;
a memory device that stores instructions executable by the processor to:
display, on a secondary display device operatively coupled to a primary display device, sensitive information received from the primary display device, wherein the sensitive information comprises information filtered from content requested to be displayed by the primary display device and wherein the primary display device displays non-sensitive information contained within the content, wherein the secondary device is an augmented reality headset that displays at least one of: virtual reality and mixed reality, wherein the information filtered on the primary display device comprises redacting the sensitive information on the primary display device.

* * * * *